United States Patent [19]

Takiguchi

[11] Patent Number: 4,758,954
[45] Date of Patent: Jul. 19, 1988

[54] METHOD OF ADJUSTING TICKET FARES

[75] Inventor: Kiyoaki Takiguchi, Yokohama, Japan

[73] Assignee: Computer Services Corporation, Tokyo, Japan

[21] Appl. No.: 65,088

[22] Filed: Jun. 19, 1987

Related U.S. Application Data

[63] Continuation of Ser. No. 634,356, Jul. 25, 1984, abandoned.

[51] Int. Cl.$^4$ .............................................. G06K 7/00
[52] U.S. Cl. .................................... 364/401; 235/384
[58] Field of Search ................ 364/401; 235/477, 475, 235/493, 384

[56] References Cited

U.S. PATENT DOCUMENTS

| | | | |
|---|---|---|---|
| 3,229,074 | 7/1966 | Harrington | 235/384 |
| 3,501,622 | 3/1970 | Weir et al. | 235/384 |
| 3,859,507 | 7/1975 | Konya | 235/384 |
| 3,958,103 | 5/1976 | Oka et al. | 235/384 |
| 4,303,904 | 12/1981 | Chasek | 235/384 |
| 4,357,530 | 11/1982 | Roes et al. | 235/475 |
| 4,438,035 | 12/1984 | Withnall et al. | 235/384 |
| 4,535,892 | 8/1985 | Roes et al. | 235/384 |
| 4,555,618 | 11/1985 | Roskin | 235/384 |
| 4,608,488 | 8/1986 | Hirose et al. | 235/384 |

FOREIGN PATENT DOCUMENTS

| | | | |
|---|---|---|---|
| 5330397 | 9/1976 | Japan | 235/384 |
| 857658 | 7/1961 | United Kingdom | 235/384 |
| 2142178 | 7/1985 | United Kingdom | 235/384 |
| 2152720 | 8/1985 | United Kingdom | 235/384 |

OTHER PUBLICATIONS

Shiro Okajime et al. "New Toll Collection System", Jan.-Feb. 1980, 30-33.

Primary Examiner—Jerry Smith
Assistant Examiner—Kimthanh Tbui
Attorney, Agent, or Firm—Koda and Androlia

[57] ABSTRACT

Tickets carrying information indicative of ticket fares are effective for use on different transportation routes run by different transportation entities. After the tickets have been retrieved at terminal ends or stations of the transportation routes, the information is read from the tickets, and the transportation entities are billed for ticket fares or fare differences calculated on the basis of the read information.

3 Claims, 15 Drawing Sheets

READING DIRECTION

METHOD OF ADJUSTING TICKET FARES

This is a continuation of application Ser. No. 634,356, filed July 25, 1984 now abandoned.

BACKGROUND OF THE INVENTION

The present invention relates to a method of adjusting ticket fares in a network of different transportation routes which can selectively be taken by a passenger carrying a single common ticket, and more particularly to a method of quickly, accurately, and effectively adjusting ticket fares among different transportation entities based on information stored in common tickets used by passengers and finally retrieved by the transportation entities.

Major cities have a network or system of interconnected transportation routes or lines such as of trains and buses run by different companies. Previously, passengers had to buy other tickets sold by different transportation companies in order to change routes. It was however quite troublesome and time-consuming for passengers to buy different tickets at transfer stations each time they change trains or buses. To eliminate the trouble and time, a system has been introduced to allow passengers who wish to take different successive routes to buy at a starting station a ticket which is effective for the routes. This ticket purchase system is highly convenient provided there is only one choice for the final transportation route since each starting station on the first route has to have only a relatively small number of tickets of different fares. However, where there are several final transportation routes (run by the same or different companies) which passengers can take, each starting station is required to have many different common tickets for each of the different final routes. Storing and dispensing such many different tickets manually or through ticket dispensers at each station is quite complex and costly. Fare adjustments among the different transportation companies involved in such a transportation network are quite complicated because many different common tickets have to be picked out from ordinary tickets, classified, and totalled. Similarly, where there are several first transportation routes (run by the same or different companies) which passengers can take, fare adjustments are also very complex to perform.

It has been proposed to introduce a ticket purchase system which will eliminate the trouble of keeping many different types of common tickets by selling tickets that can be used by passengers to freely select any desired transportation line of different transportation companies. Though the proposed ticket purchase system would be advantageous at the point of selling tickets, it would still suffer a complex fare adjustment procedure which would be laborious and subject to errors.

SUMMARY OF THE INVENTION

It is an object of the present invention to provide a method of automatically adjusting ticket fares among different transportation entities in a transportation network based on pieces of information stored in retrieved tickets.

According to the present invention, there is provided a method of automatically adjusting ticket fares among different transportation entities in a transportation network composed of a first transportation route and a plurality of transportation routes connected to the first transportation route, the method comprising the steps of issuing tickets effective for use in the first transportion route and any one of the second transportation routes at a starting end of the first transportation route, the tickets storing therein information indicative of ticket fares, retrieving the tickets at a terminal end of the one of second transportation routes, reading the information from each of the retrieved tickets, and adjusting ticket fares among the transportation entities for the first and second transportation routes based on the read information.

According to the present invention, there is also provided a method of automatically adjusting ticket fares among different transportation entities in a transportation network composed of a plurality of first transportation routes and a second transportation route connected to the first transportation routes, the method comprising the steps of issuing tickets effective for use in any one of the first transportion routes and the second transportation route at a starting end of each of the first transportation routes, the tickets storing therein information indicative of ticket fares, retrieving the tickets at a terminal end of the second transportation route, reading the information from each of the retrieved tickets, and adjusting ticket fares among the transportation entities for the first and second transportation routes based on the read information.

According to the present invention, there is also provided a method of automatically adjusting ticket fares among different transportation entities in a transportation network composed of a plurality of transportation routes, the method comprising the steps of issuing tickets effective for use in any one of the transportion routes at a starting end of each of the transportation routes, the tickets storing therein information indicative of ticket fares, retrieving the tickets at a terminal end of the one of transportation route, reading the information from each of the retrieved tickets, and adjusting ticket fares among the transportation entities for the transportation routes based on the read information.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 1:
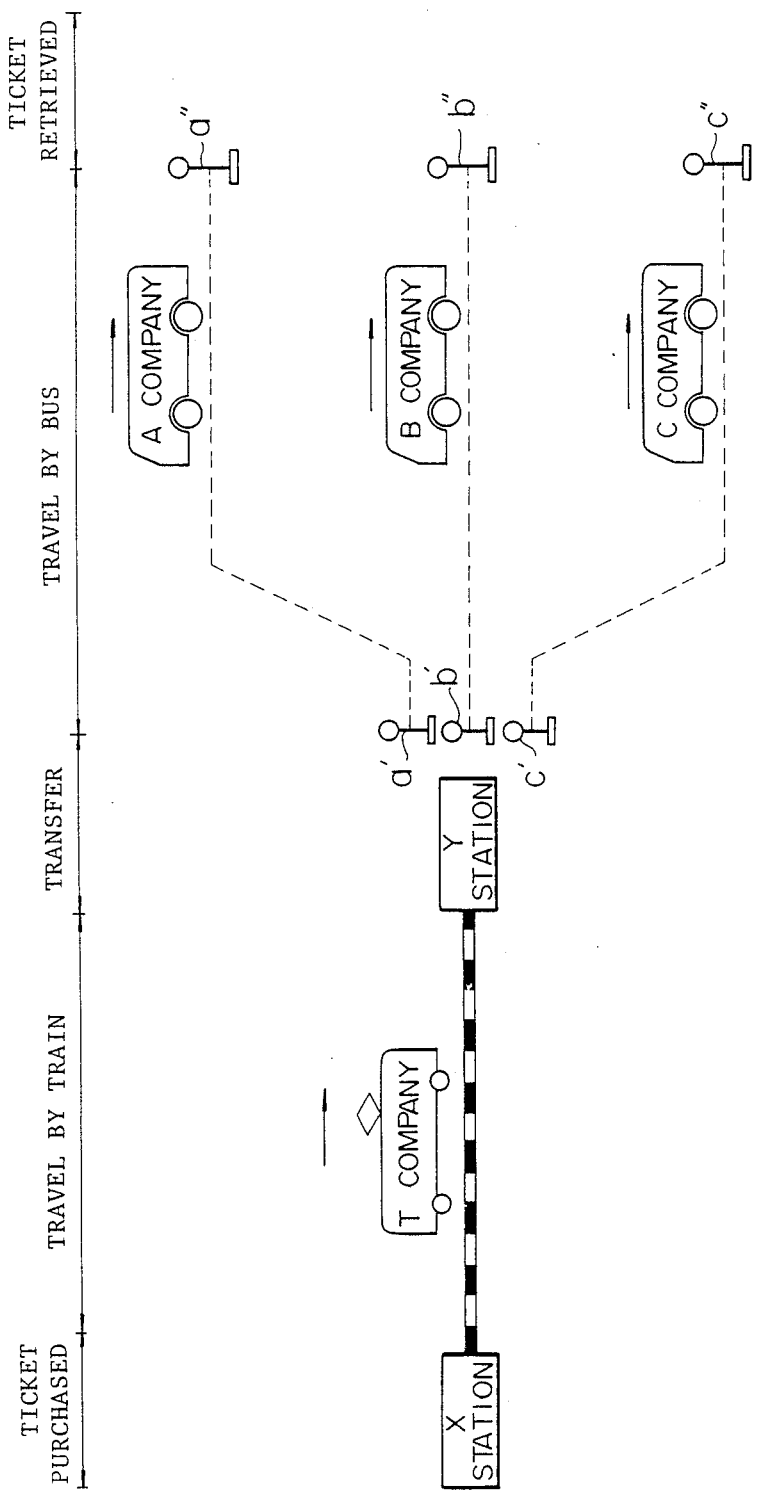
FIG. 1 a diagram showing a transportation network in which a method of the invention is employed.
Figure 2:
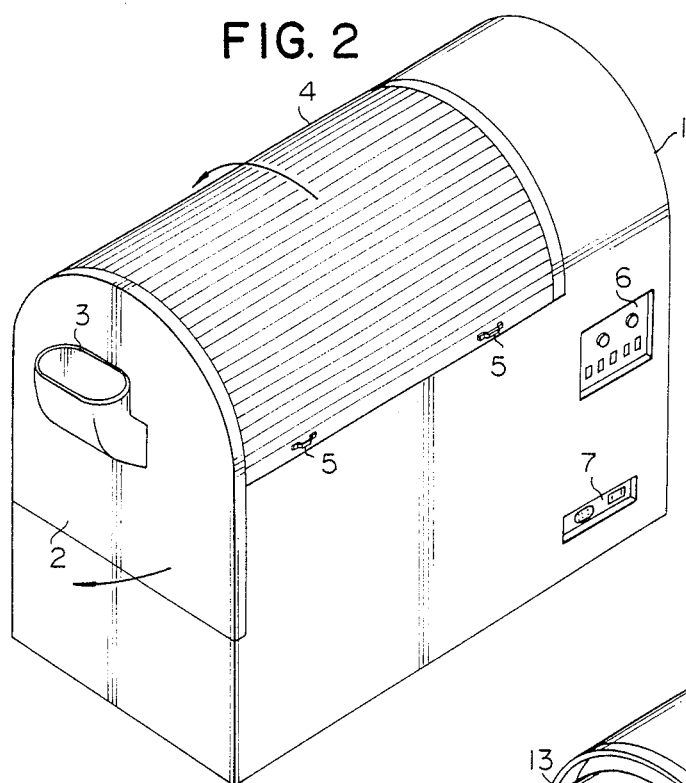
FIG. 2 is a perspective view of a ticket sorting device used for carrying out the method of the invention.

FIG. 1 shows a network of transportation routes or lines run by different transportation companies and available freely selectably to passengers who carry common tickets.

The illustrated transportion network has a single railway starting with an X station and ending with a Y station and run by a T company and three parallel bus lines starting with bus stops a', b', c', respectively, near the Y station, and ending with bus stops a", b", c", respectively, and run by A, B, and C companies, respectively. To travel from the X station to one of the bus stops a", b", and c", a passenger buys a common ticket which covers the fares for the railway and any one of the bus lines (the fares for the three bus lines are the same). The passenger takes the train from the X to the Y station, and then takes a desired one of the three bus lines from the bus stop a', b', or c'to the bus stop a", b", or c". The ticket is retrieved at the bus stop a", b", or c" by one of the bus lines which the passenger has taken. Tickets retrieved from passengers by the A, B, and C companies are processed to calculate the total bus fares for the passengers who took their buses for the purpose of fare adjustment. Then, the A, B, and C companies then bill the T company for calculated bus fares. The T company pays the billed charges to the A, B, and C companies, because the T company has already collected the bus fares at the X station which are part of the fares of the common tickets that the T company sold. The fare adjustment is now completed.

FIGS. 2 through 8 illustrate a sorting device used for sorting out and reading information from common tickets retrieved from passengers by the bus lines at the bus stops a", b", and c". The sorting device comprises an elongated body 1 having a semicylindrical upper portion with vertical opposite end faces. To one of the end faces, there is hinged a cover 2 angularly swingable in a lateral direction and having a charging chute 3 projecting centrally from the cover 2 and having an upper open end for receiving tickets to be sorted out. The charging chute 3 is curved with its lower open end opening into a sorter drum (described later) housed in the body 1. The semicylindrical upper portion of the body 1 is recessed to provide an opening which is of a length that is about ⅔ of the entire length of the body 1, and which is normally closed by a shutter 4 slidably openable along an arcuate path in the direction of the arrow, the shutter 4 having handles 5 on an end thereof. The body 1 has on a side surface thereof a control panel 6 with switches and controllers mounted thereon and a power board 7 with a power inlet and a signal cable connector mounted thereon.

Figure 3:
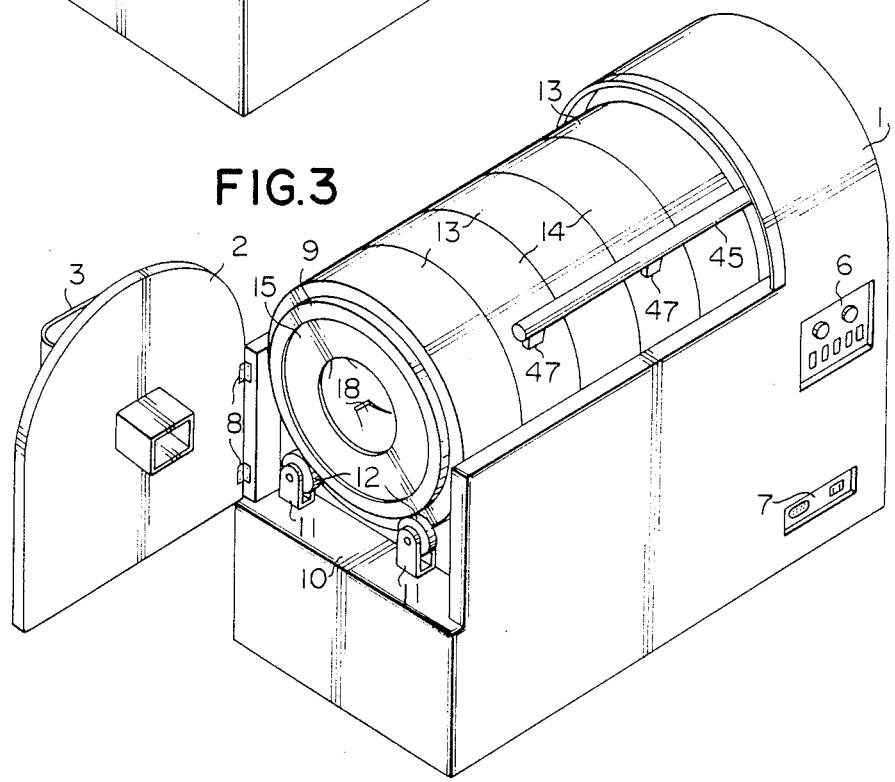
FIG. 3 is a perspective view of the ticket sorting device of FIG. 2 with an end wall and a shutter open to show the interior of the ticket sorting device.

FIG. 3 shows the sorting device with the cover 2 swung open through about 90 degrees and the shutter 4 retracted to uncover the upper open portion of the body 1. The cover 2 is pivotably joined to the body 1 by a pair of hinges 8. The shutter 4 is slidably withdrawn back into a sidewall of the body 1. With the cover 2 and the shutter 4 thus opened, the interior of the body 1 can easily be accessed for maintenance and servicing. A cylindrical sorter drum 9 is horizontally disposed centrally in the body 1 with an axis substantially aligned with the central axis of the semicylindrical upper portion of the body 1. The body 1 includes a pair of transverse supports 10, 10 (FIG. 5) spaced from each other in the longitudinal direction of the body 1 and mounted on inner wall surfaces of the body 1. A pair of bearings 11, 11 is mounted on each of the supports 10, 10, and a pair of rollers 12, 12 is rotatably supported on the bearings 11, 11, respectively. The axial ends of the sorter drum 9 are rotatably supported by the rollers 12 on the supports 10. Three first annular guide channels 13 surround the sorter drum 9 in axially spaced relation, and two second annular guide channels 14 axially alternate with the first annular guide channels 13 in surrounding relation to the sorter drum 9.

Figure 4:
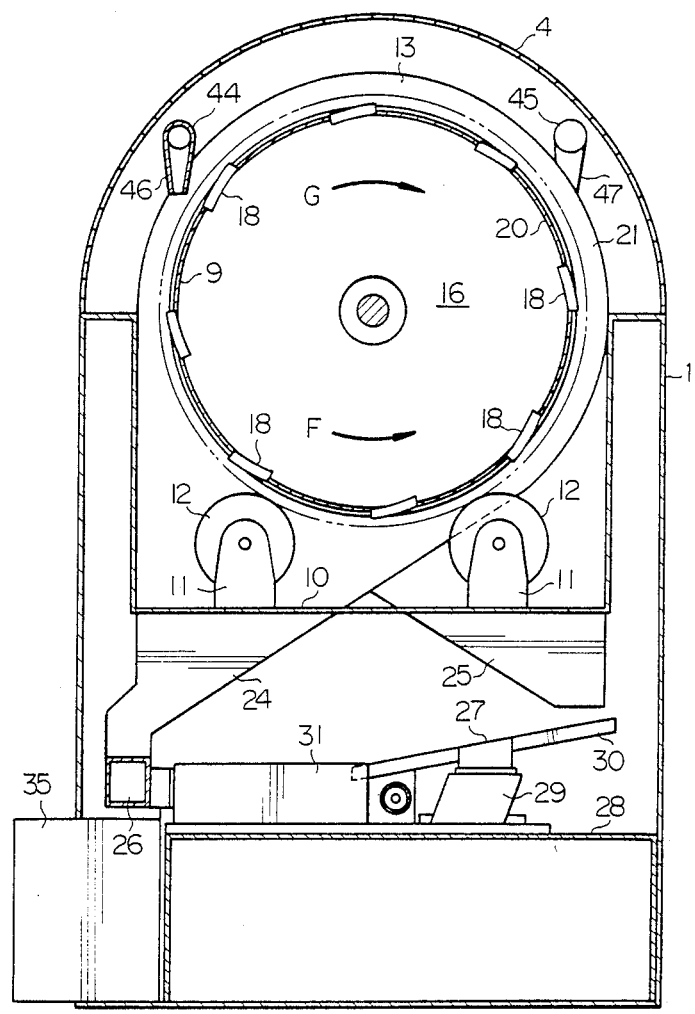
FIG. 4 is a sectional side elevational view of the ticket sorting, device.
Figure 5:
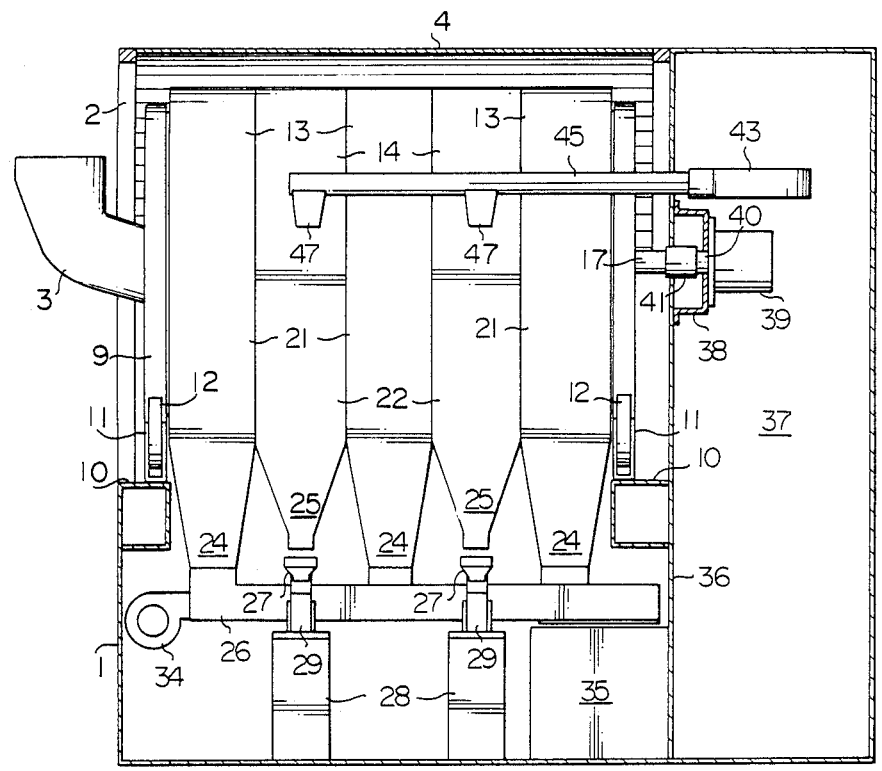
FIG. 5 is a sectional front elevational view of the ticket sorting device.

As shown in FIGS. 4 through 7, the sorter drum 9 is made of a thin metal sheet and has one end closed and other end fitted over an annular plate 15 having a central circular opening. The annular plate 15 serves to prevent tickets from going out of the sorter drum 9 while the tickets are being sorted out. The closed end of the sorter drum 9 has a circular closing plate 16 to which a drive shaft 17 is coaxially connected. The sorter drum 9 has thereon a first group of three rows of sorters 18 and a second group of two rows of sorters 19, the rows of sorters 18 axially alternating with the rows of sorters 19. The guide channels 13 are disposed around the rows of first sorters 18 in surrounding relation thereto, while the guide channels 14 are disposed around the rows of second sorters 19 in surrounding relation thereto. Each of the guide channels 13 is composed of a substantially circular plate 21 having a pair of annular flanges or sidewalls with their inner peripheral edges 20 slightly spaced radially outwardly from the outer circumferential surface of the sorter drum 9. The guide channel 13 also includes a discharge chute 24 having a downwardly opening discharge hole. Similarly, each of the guide channels 14 is composed of a substantially circular plate 22 having a pair of annular flanges with their inner peripheral edges 23 slightly spaced radially outwardly from the outer circumferential surface of the sorter drum 9. The circular plates 21, 22 are supported in the body 1 independently of the sorter drum 9. The guide channel 14 also includes a discharge chute 25 having a downwardly opening discharge hole. The discharge chutes 24, 25 are staggered in the axial direction of the sorter drum 9 as shown in FIG. 4.

Figure 7:
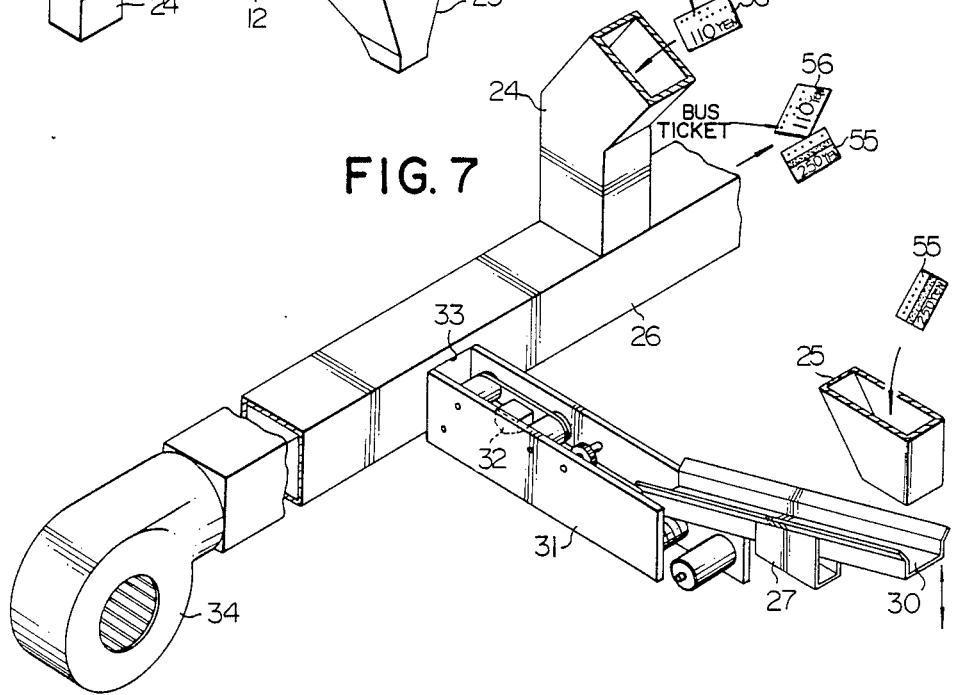
FIG. 7 is a fragmentary perspective view of a ticket discharge system below the sorter drum.

As shown in FIGS. 4 and 7, the open ends of the chutes 24 are connected to a horizontal discharge duct 26. A separator mechanism 27 is disposed below the open end of each of the discharge chutes 25. As shown in FIG. 4, the separator mechanisms 27 are supported respectively on supports 29 mounted, respectively, on box-shaped mounts 28 placed on the bottom of the body 1. Each separator mecahnism 27 includes an electromagnetically vibratable trough 30 inclined downwardly toward the discharge duct 26. A magnetic reader mechanism 31 is disposed between the discharge duct 26 and the trough 30, and comprises a magnetic pickup head 32 and a conveyer belt system for delivering tickets supplied from the trough 30 toward the discharge chute 26 through the magnetic pickup head 32. The magnetic reader mechanism 31 has a terminal end facing an opening 33 defined in a sidewall of the discharge chute 26. The discharge chute 26 is hollow and has a square cross section. An air blower 34 is coupled to an end of the discharge chute 26, the other end of which opens above a shredder 35 (FIG. 4).

Figure 6:
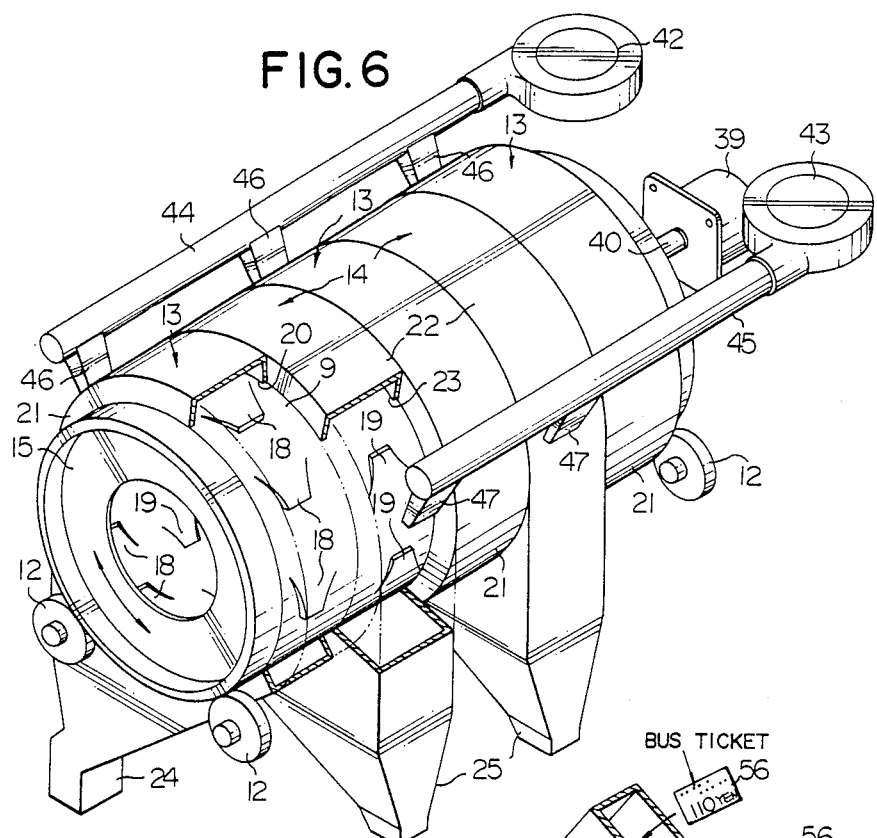
FIG. 6 is a perspective view, partly broken away, of a sorter drum and surrounding parts.

The body 1 has a vertical partition 36 on which the support 10 is supported, the vertical partition 36 defining a machine chamber 37 remote from the sorter drum 9. A channel 38 is mounted on the partition 36 in the machine chamber 37 and supports thereon a motor 39 having an output shaft 40 joined by a coupling 41 to the drive shaft 17. As best shown in FIG. 6, a pair of air blowers 42, 43 is disposed in the machine chamber 37 slightly above the motor 39. A pair of horizontal air pipes 44, 45 is coupled to the air blowers 42, 43, respectively, and disposed one on each side of the sorter drum 9. The air pipe 44 communicates through nozzles 46 with the guide channels 13, and the air pipe 45 communicates through nozzles 47 with the guide channels 14. The nozzles 46, 47 are downwardly tapered and have lower open ends directed toward the sorters 18, 19, respectively.

Figure 8:
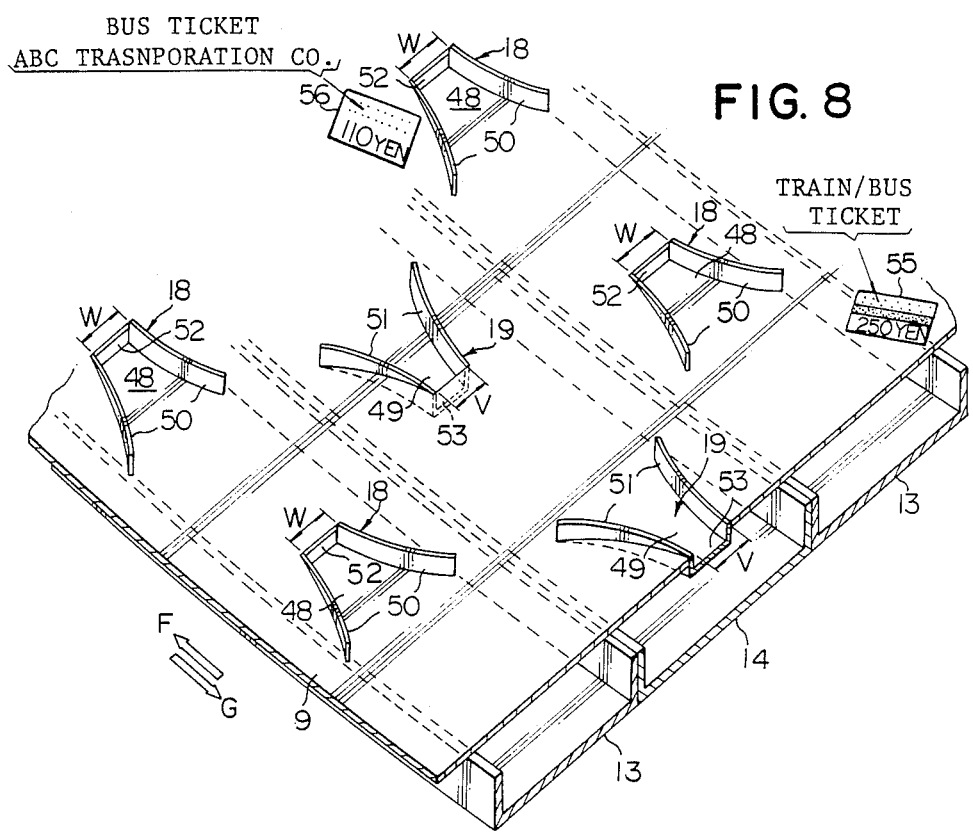
FIG. 8 is an enlarged fragmentary perspective view of ticket sorting mechanisms on the sorter drum.

As shown in FIG. 8, each of the sorters 18 includes a tapered tongue 48 sheared radially outwardly off the cylindrical wall. The tapered tongue 48 has an end edge displaced radially outwardly from the cylindrical wall to define therewith an opening 52 extending radially outwardly and having a length W that is selected to allow passage of tickets of a particular size through the opening 52. Accordingly, the tapered tongues 48 terminate respectively in the openings 52 and are progressively narrower toward the openings 52 to provide tapered slide surfaces. A pair of guide strips 50, 50 extends along the opposite side edges of each tapered tongue 48 and is secured to both the side edge and the cylindrical wall. The guide strips 50 paired on both sides of each slide surface thus provide a chute for guiding tickets to be sorted out toward the the opening 52. More specifically, one end of each guide strip 50 is located at the distal end of the slide surface and serves to define the opening 52, while the other end is positioned at the opposite end of the slide surface which blends into the cylindrical wall of the sorter drum 9, and protrudes radially inwardly of the sorter drum 9. Likewise, each of the sorters 19 includes a tapered tongue 49 sheared radially outwardly off the cylindrical wall and circumferentially in a direction opposite to that in which the tapered tongues 48 are oriented. The tapered tongue 49 has an end edge displaced radially outwardly from the cylindrical wall to define therewith an opening 53 extending radially outwardly and having a length V that is selected to allow passage of tickets of another particular size through the opening 53. Accordingly, the tapered tongues 49 terminate respectively in the openings 53 and are progressively narrower toward the openings 53 to provide tapered slide surfaces. A pair of guide strips 51, 51 extends along the opposite side edges of each tapered tongue 49 and is secured to both the side edge and the cylindrical wall. The guide strips 51 paired on both sides of each slide surface thus provide a chute for guiding tickets to be sorted out toward the the opening 53. More specifically, one end of each guide strip 51 is located at the distal end of the slide surface and serves to define the opening 53, while the other end is positioned at the opposite end of the slide surface which blends into the cylindrical wall of the sorter drum 9, and protrudes radially inwardly of the sorter drum 9.

Figure 9:
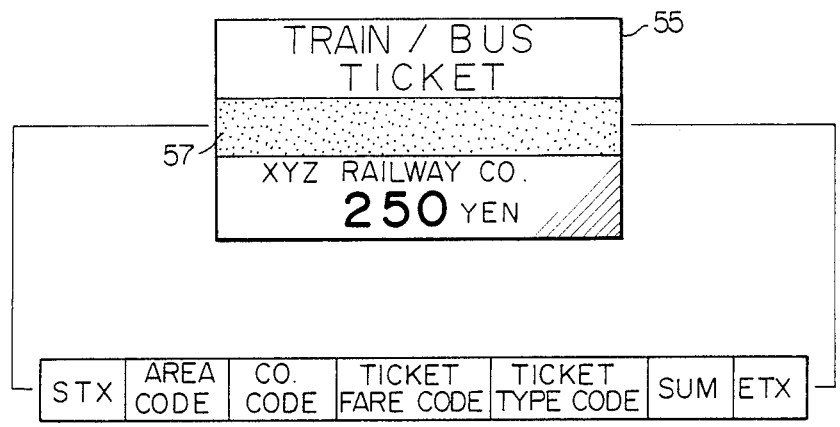
FIG. 9 is an enlarged plan view of a common ticket and a magnetic format thereon.

FIG. 9 shows a common ticket 55 and data recorded thereon. The ticket 55 has a longitudinal central magnetic strip 57 coated on one surface thereof and having a width that is about one-third of the entire width of the ticket. A fare is printed on the ticket on one side of the magnetic strip 57 and a company name on the other side. Information is magnetically recorded on the magnetic strip 57 in a data format composed of "STX", "AREA CODE", "COMPANY CODE", "TICKET FARE CODE", "TICKET TYPE CODE", "SUM", and "ETX". "STX" indicates the direction in which to start data reading, "AREA CODE" indicates an area in which the ticket is effective, "COMPANY CODE" is the predetermined code of the name of a company which issues the ticket, "TICKET FARE CODE" the code of a printed fare, "TICKET TYPE CODE" the code indicative of whether the ticket is for adults or children, "SUM" the code of a sum check value for all recorded data, and "ETX" indicates the end of data reading.

Figure 10:
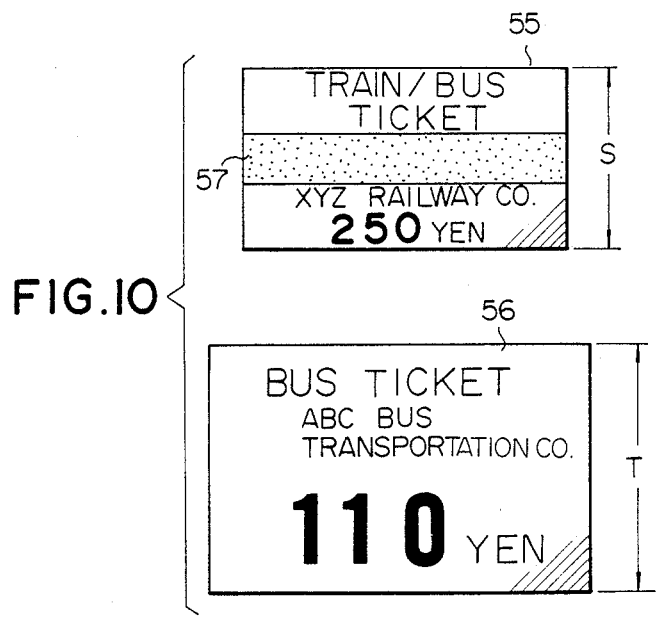
FIG. 10 is an enlarged view showing a common ticket and an ordinary ticket.

The sorting device of the foregoing construction is particularly useful for sorting out two kinds of tickets of different sizes are used. FIG. 10 shows such two different tickets. One type of ticket is a ticket 55 (same as the ticket 55 shown in FIG. 9) which is issued by the railway company T and can be used for buses of the different bus companies A, B, C, and the other ticket type is an ordinary ticket 56 that is issued by and effective for one of the bus companies A, B, C only. The ticket 56 bears the company name and fare. The ticket 55 has a width S smaller than the length V of the opening 53 of the sorters 19. The ticket 56 has a width T larger than the length W of the opening 52 of the sorters 18. The width T is larger than the width W.

Figure 11:
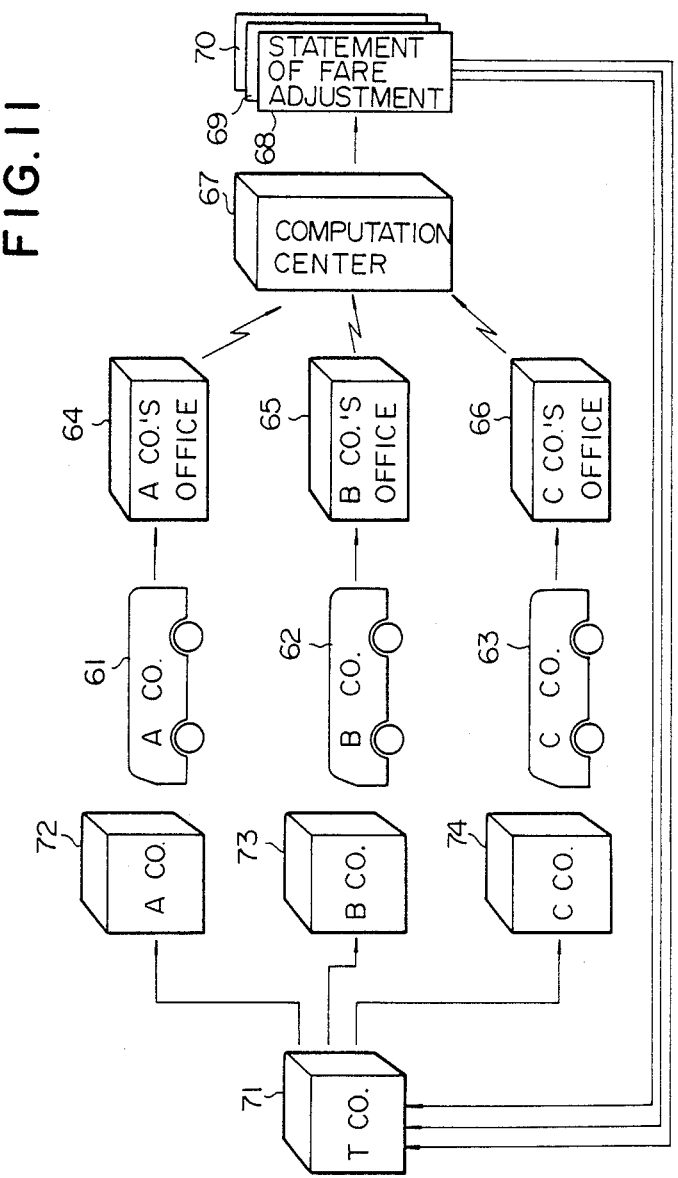
FIG. 11 is a diagram illustrative of a method of adjusting fares of common tickets according to the present invention.

FIG. 11 schematically illustrates a billing system for common tickets 55 which have been issued by the railway company T and used for the railway of the railway company T and any one of the buses of the bus companies A, B, C. Retrieval boxes at the bus stops a", b", c" (FIG. 1) contain common tickets 55 used by those passengers who took both the railway of the railway company T and one of the buses of the bus companies A, B, and C, and tickets 56 used by those passengers who took only one of the buses. Before the information recorded in the magnetic strip 57 on the tickets 55 is read out, it is necessary to sort out the tickets 55, 56. The ticket retrieval boxes are brought to offices 64, 65, 66 of the bus companies A, B, C, respectively, and the tickets 55 are automatically sorted out and stored information is read out by the sorting devices (shown in FIGS. 2 through 8) installed in the offices 64, 65, 66. Prior to sorting out the tickets 55, it is necessary to separate coins and bank notes manually or mechanically from the tickets 55, 56.

Operation of the ticket sorting device will then be described.

Mixed tickets 55, 56 are thrown down the chute 3 into the sorter drum 9. The start switch on the control board 6 is turned on to energize the motor 39 to rotate the sorter drum 9 in the direction of the arrow F (FIG. 4). Thus, the sorter drum 9 rotates about its own axis with the wider ends of the tapered tongues 51 as leading ends and the openings 53 as trailing ends, causing the tickets 55, 56 to slide on the inner peripheral surface of the sorter drum 9 and be mixed with each other. The tickets 55, 56 tend to be collected in a lower position in the rotating soter drum 9, wherein the tickets 55, 56 are guided by the guide strips 51 toward the openings 53 of the sorters 19 over the tapered tongues 49. Since the length V of the openings 53 is larger than only the width S of the tickets 55, only the tickets 55 are allowed to pass through the openings 53 out of the sorter drum 9. The larger tickets 56 however remain trapped inside the sorter drum 9 as they cannot go through the openings 53 and may get caught by the guide strips 51 or slide over the openings 53. The tickets 55 as they are discharged out of the sorter drum 9 are then received by the guide channels 14, from which the tickets 55 slide down the discharge chutes 25. The tickets 55 from each discharge chute 25 are then placed on the trough 30 which vertically vibrates to feed the tickets 55 one by one toward the magnetic reader mechanism 31. The tickets 55 are delivered by the conveyor belt system toward the magnetic pickup head 32, which reads the recorded information from the magnetic strip 57 on the ticket 55. The magnetic pickup head 32 issues an electric signal indicative of the read information through the connector on the power board 7 to a data processing and storage system, in which the information is processed and stored for the respective bus companies A, B, C. The tickets 55 are then discharged from the magnetic reader mechanism 31 into the discharge duct 26, and forced by air currents from the air blower 34 to the other end of the discharge duct 26, from which the tickets 55 drop into the shredder 35. The tickets 55 are then cut into pieces by the shredder 35.

After all of the tickets 55 have been discharged out of the sorter drum 9, the rotation of the motor 39 is reversed to rotate the sorter drum 9 in the direction of the arrow G to allow the tickets 56 to pass through the openings 52 of the sorters 18 into the guide channels 13. The tickets 56 then go through the discharge chutes 24 into the discharge duct 26, from which they are blowen into the shredder 35.

While the sorter drum 9 rotates to sort out the tickets 55, 56, the air blowers 42, 43 are actuated to generate air currents through the air pipes 44, 45. The air currents are emitted from the air pipes 44, 45 through the nozzles 46, 47 into the guide channels 13, 14. Since the nozzle ends are directed to the sorters 18, 19, the air currents enter the openings 52, 53 of the sorters 18, 19 to blow any tickets 55, 56 which have been jammed in the openings 52, 53, off into the sorter drum 9. Accordingly, the efficiency of sorting out the tickets is improved.

The information read from the magnetic strips 57 of the tickets 55 is sent from the offices 64, 65, 66 to a computation center 67 on a real-time basis or as a batch of information over telephone lines or other communication systems. Based on the transmitted information, the computation center 67 computes the numbers, fares and the types of the tickets used for every week or month. The computed data are recorded on bills 68, 69, 70 for the respective bus companies A, B, C, and the bills 68, 69, 70 are sent to the company T. The company T then pays the billed amounts to the bus companies A, B, C. The fare adjustment is now completed.

Figure 12:
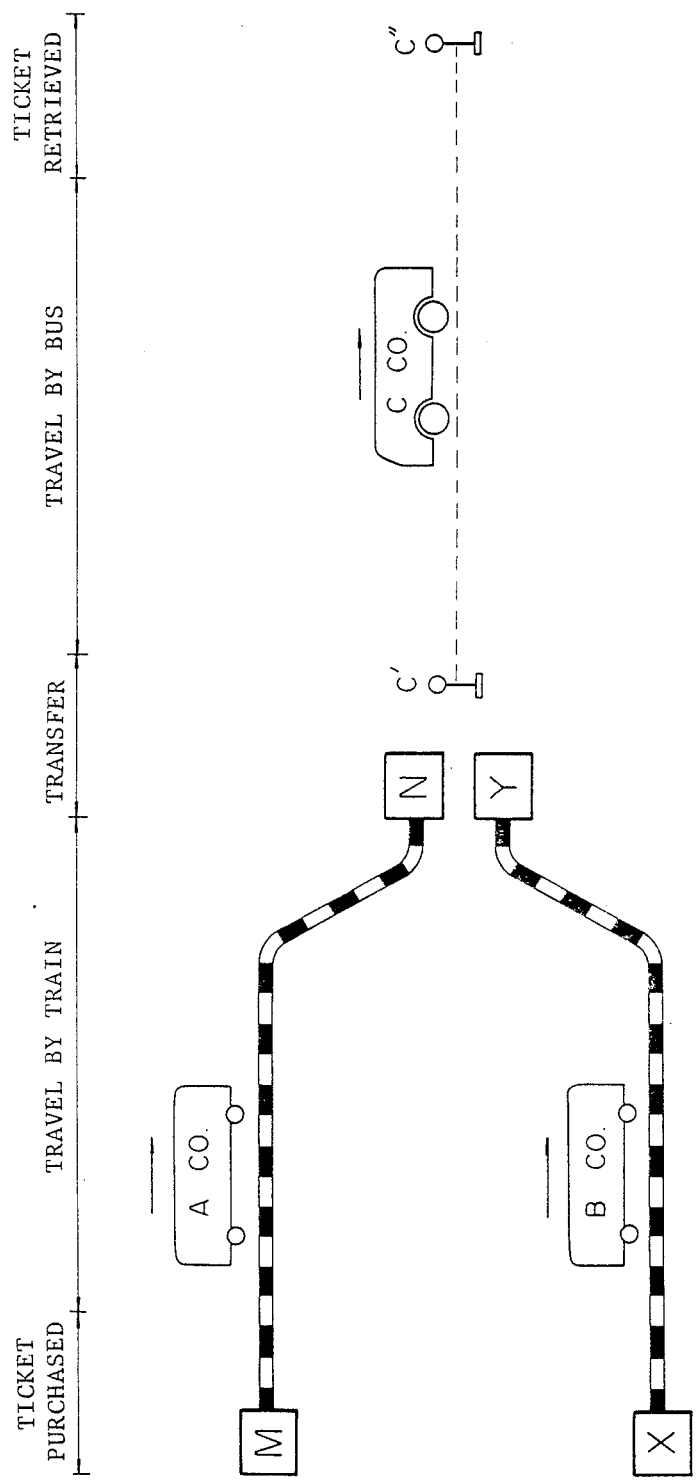
FIG. 12 is a diagram showing another transportation network in which a method of the invention is employed.

FIG. 12 illustrates another network of transportation routes to which the present invention is applicable. The transportion network includes two railways starting with M and X stations and ending with N and Y stations and run by different A and B companies and a single bus line starting with a bus stop c′ near the N and Y stations and ending with a bus stop c″ and run by C company. To travel from the M or X station to the bus stop c″, a passenger buys at the M or X station a common ticket which covers the fares for one of the railways (the fares for the two railways are the same) and the bus line. The passenger takes the train from the M to the N station or the train from the X to the Y station, and then takes the bus line from the bus stop c′ to the bus stop c″. The ticket is retrieved at the bus stop c″ by the bus line. Tickets retrieved from passengers by the C company are processed to calculate the total bus fares for the passengers who took the bus for the purpose of fare adjustment. Then, the C company then bills the A and B companies for calculated bus fares. The A and B companies pay the billed charges to the C company, because the A and B companies have already collected the bus fares at the M and X stations as part of the fares of the common tickets that the A and B companies. The fare adjustment is now completed.

Figure 13:
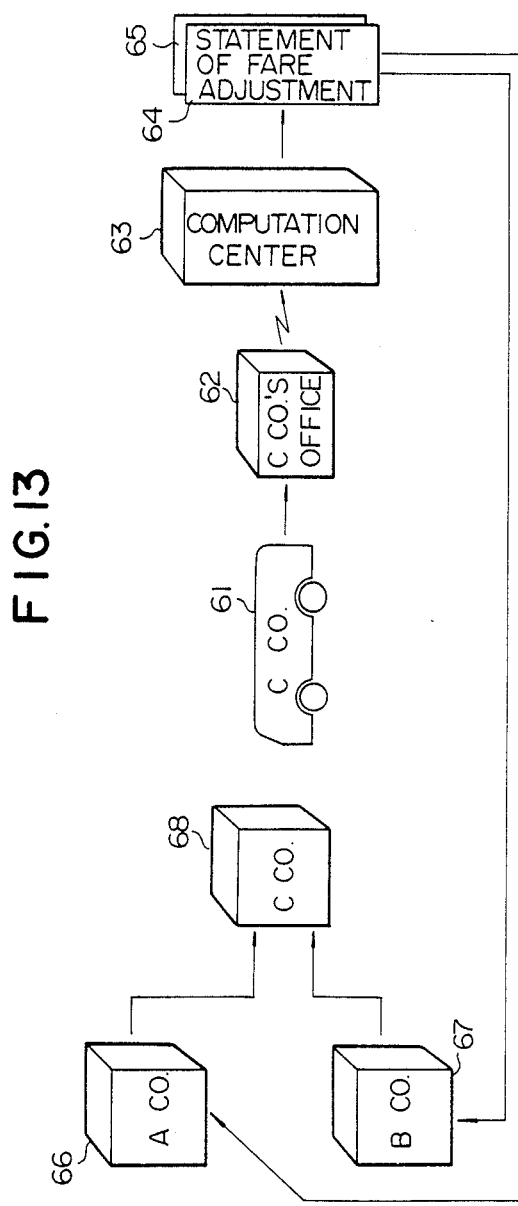
FIG. 13 is a diagram illustrative of a method of adjusting fares of common tickets according to the present invention.

As shown in FIG. 13, the information read from the magnetic strips 57 of the tickets 55 is send from a C company's office 62 to a computation center 63 on a real-time basis or as a batch of information over telephone lines or other communication systems. The C company's office 62 has the sorting device as shown in FIGS. 2 through 8, so that the tickets 55 can automatically sorted out and the information read therefrom. Based on the transmitted information, the computation center 63 computes the numbers, fares and the types of the tickets used for every week or month. The computed data are recorded on bills 64, 65 which are sent to the companies A and B. The companies A and B then pay the billed amounts to the bus company C.

Figure 14:
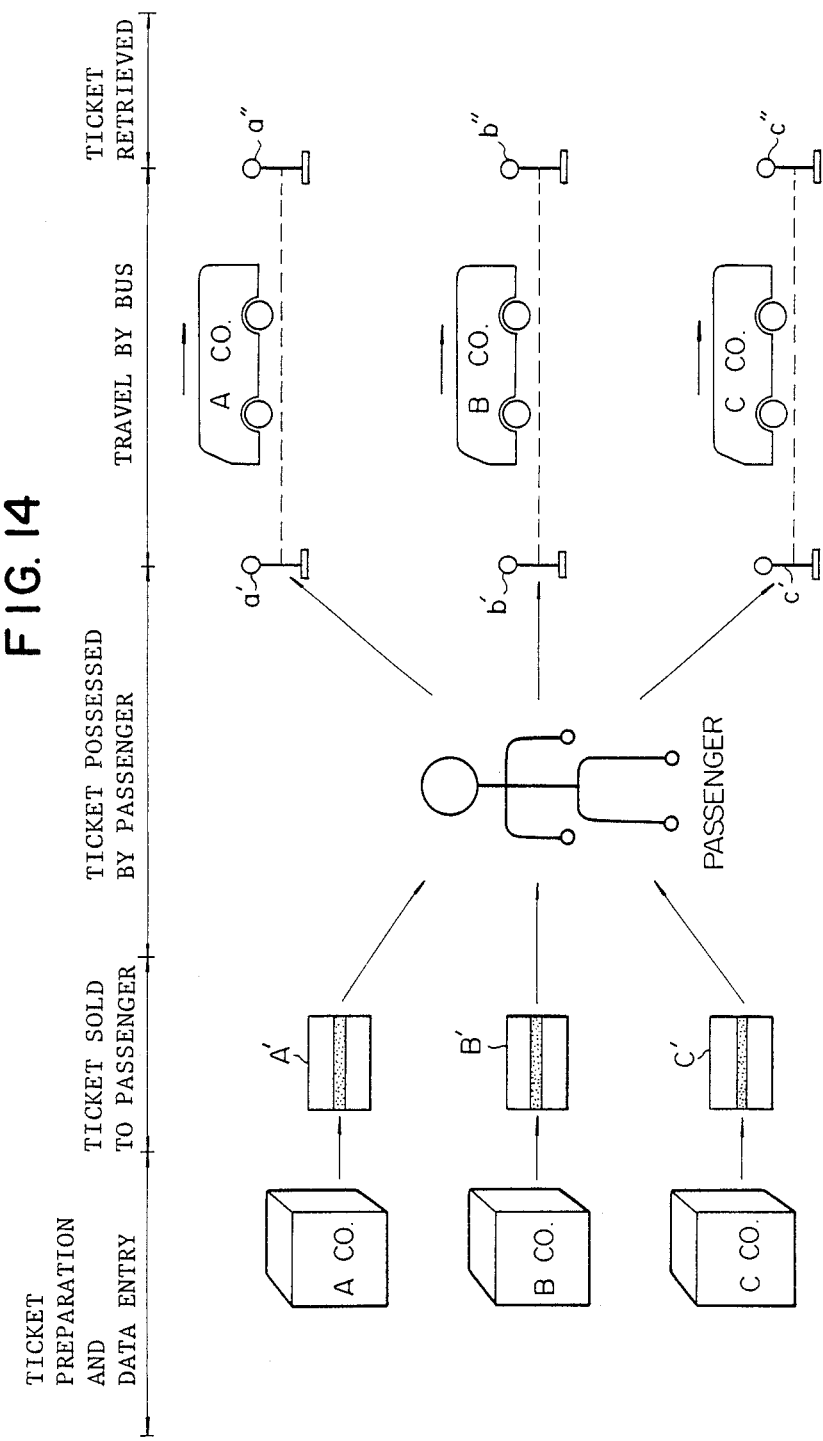
FIG. 14 is a diagram showing still another transportation network in which a method of the invention is employed.

FIG. 14 shows still another transportation network having three parallel bus lines starting with bus stops a′, b′, c′, respectively, and ending with bus stops a″, b″, c″, respectively, and run by A, B, and C companies, respectively. The A, B, and C companies prepare and issue common tickets A′, B′, C′ (each identical to the ticket 55 shown in FIG. 9) effective for any of the bus lines run by them. To travel from any one of the bus stops a′, b′, c′ to the corresponding terminal bus stop a″, b″, or c″, a passenger buys any one of the common tickets A′, B′, and C′. The passenger takes the bus from the bus stop a′, b′, or c′ to the bus stop a″, b″, or c″. The ticket is retrieved at the bus stop a″, b″, or c″ by one of the bus lines which the passenger has taken. Tickets retrieved from passengers by the A, B, and C companies are processed to calculate the total bus fares for the passengers who took their buses. Then, the A, B, and C companies bill each other for adjusting bus fares.

Figure 15:
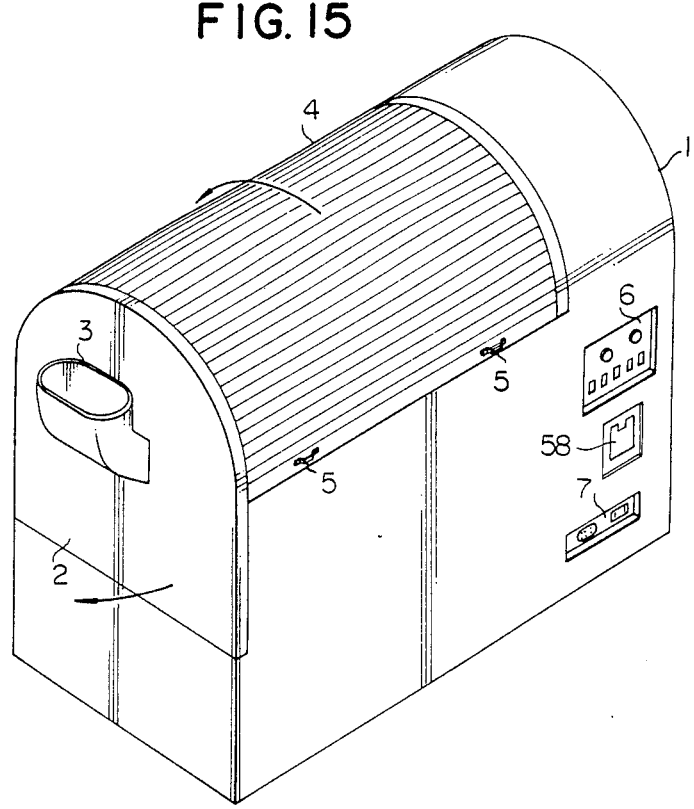
FIG. 15 is a perspective view of another ticket sorting device used for carrying out the method of the invention.

FIG. 15 shows another sorting device used for sorting out and reading information from tickets. The illustrated sorting device is of substantially the same construction as that of the sorting device shown in FIG. 2, except that the sorting device of FIG. 15 includes a floppy disk drive 58 for storing information read from sorted tickets into a floppy disk (not shown).

Figure 16:
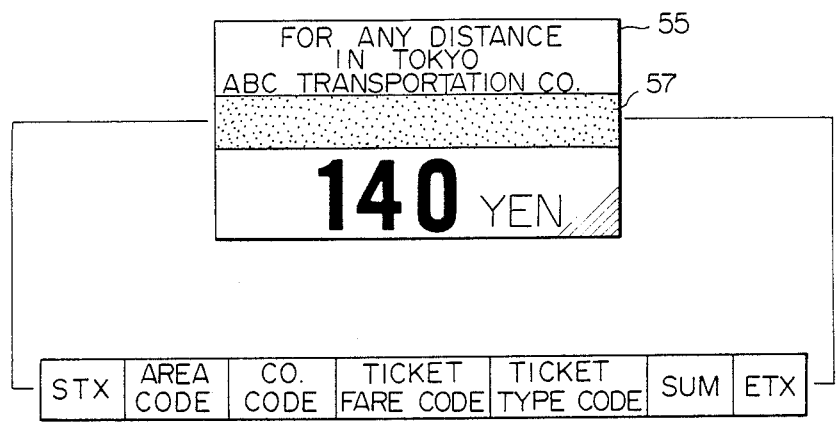
FIG. 16 is an enlarged plan view of a ticket which can be used for any distance in a particular area and a magnetic format thereof.
Figure 17:
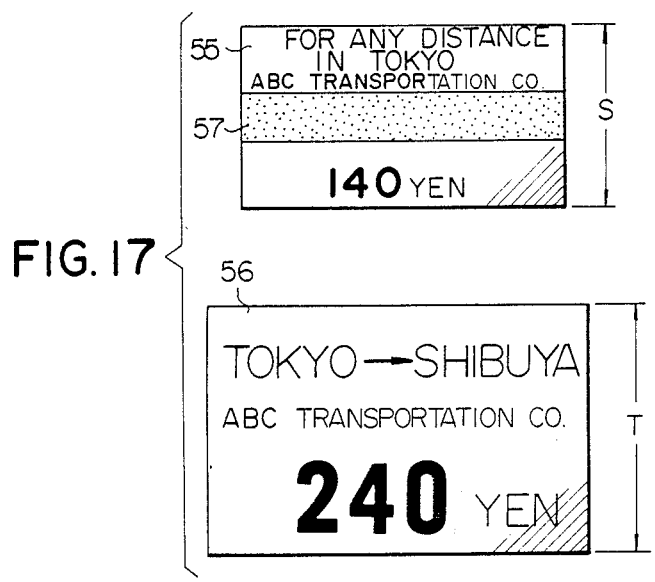
FIG. 17 is an enlarged view showing a ticket which can be used for any distance in a particular area and an ordinary ticket.

FIGS. 16 and 17 illustrate an example of a ticket to be sorted out by the sorting device. The ticket, generally designated 55, is effective for any distance in a certain area, Tokyo in the illustrated example. Otherwise, the ticket 55 of FIGS. 16 and 17 is identical to the ticket 55 illustrated in FIGS. 9 and 10.

Figure 18:
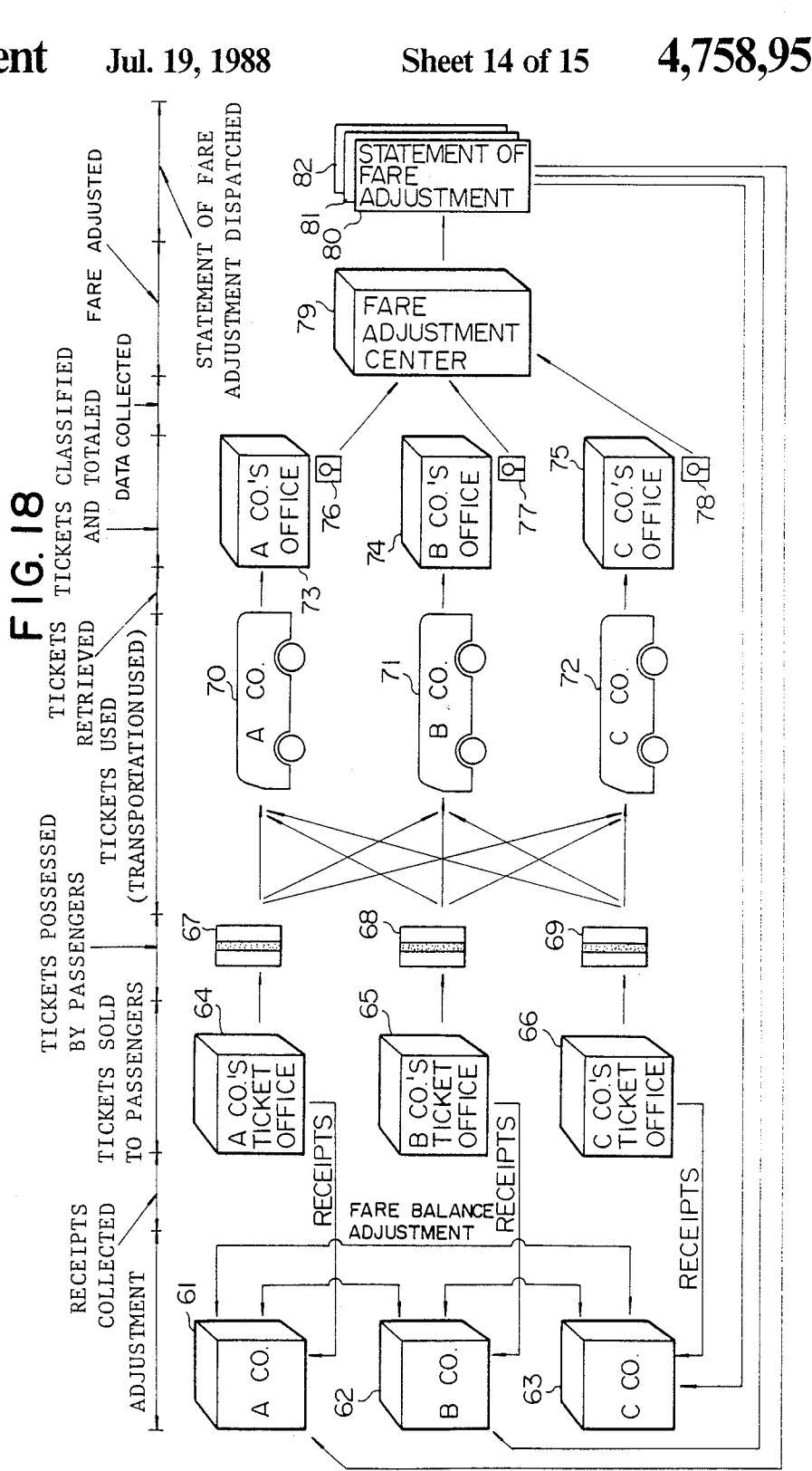
FIG. 18 is a diagram illustrative of a method of adjusting fares of common tickets according to the present invention.

FIG. 18 shows a ticket fare billing system for the transportation network shown in FIG. 14. The A, B, and C companies 61, 62, 63 have ticket offices 64, 65, 66 for selling common tickets 67, 68, 69, respectively, storing the same information as that shown in FIG. 16. Receipts for the sold tickets are collected from the ticket offices 64, 65, 66 by the A, B, and C companies 61, 62, 63. Passengers who purchased the tickets 67, 68, 69 can take any of buses 70, 71, 72 of the A, B, C companies. After the buses 70, 71, 72 have traveled their predetermined routes, the tickets 67, 68, 69 are retrieved, and separated from other tickets, coins, bank notes by the sorting devices installed in offices 73, 74, 75 of the A, B, C companies. The information stored on the tickets 67, 68, 69 is then processed to calculate the total bus fares, numbers, and types of the tickets 67, 68, 69, and the calculated data are magnetically recorded on floppy disks 76, 77 and 78. The floppy disks 76, 77, 78 are brought to a computation or fare adjustment center 79, in which the data are transferred from the floppy disks to a magnetic tape or the like. The fare adjustment center 79 then totals the fares and numbers of the tickets per week or month for the respective companies A, B, C, and calculates the differences bewteen the fares of the tickets issued by one of the bus companies and those of the tickets issued by the other bus companies for each bus line. The fare adjustment center 79 then issues bills 80, 81, 82 to the bus companies A, B, C for collecting the fare differences to adjust the bus fares each week or month. The bus companies A, B, C then pay or offset the fare differences with respect to each other. The fare adjustment center 79 uses a computer, for example, for processing the information stored in the magnetic tape so that the fare adjustment can speedily and reliably be effected in a short period of time.

Figure 19:
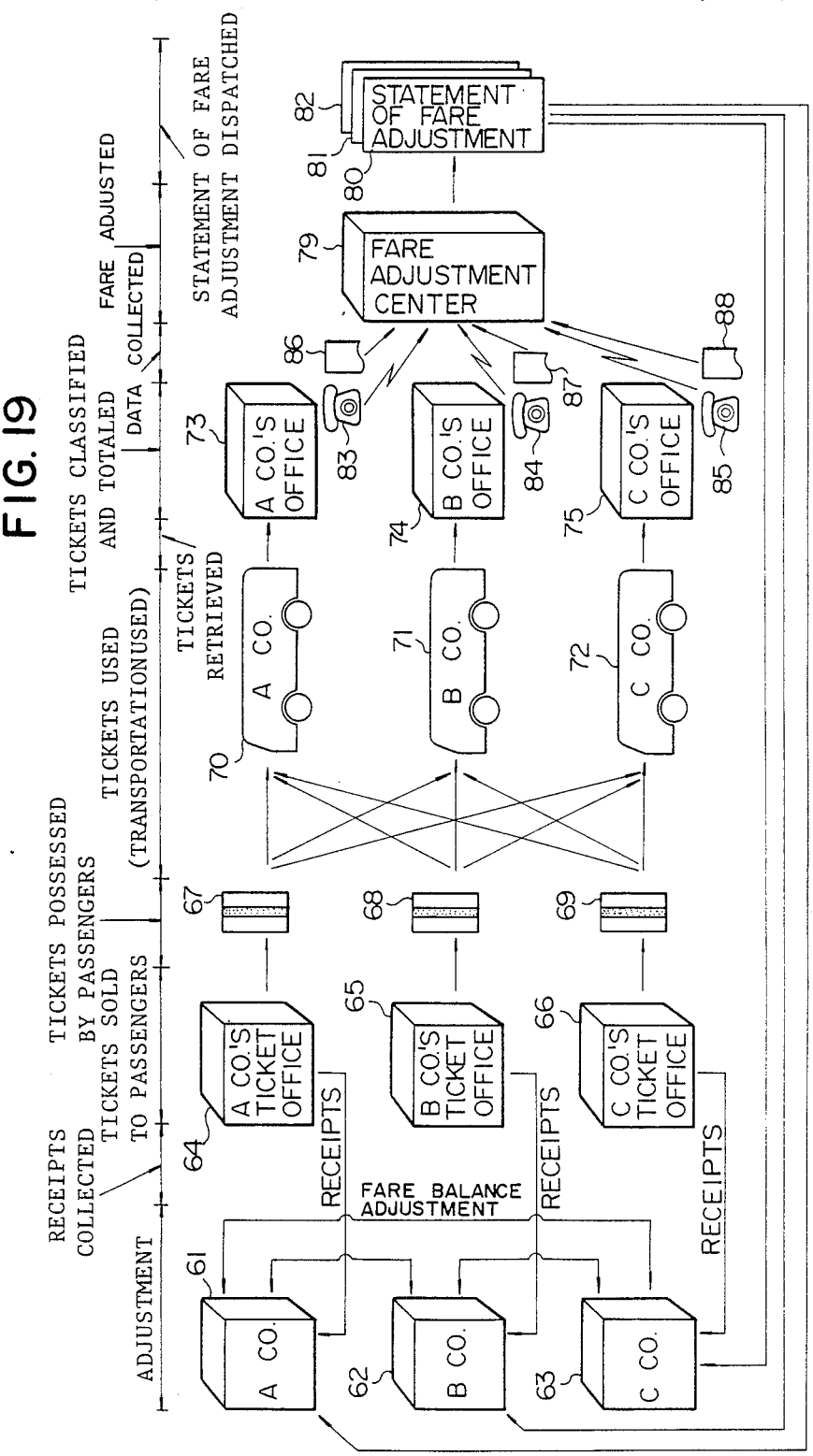
FIG. 19 is a diagram illustrative of a method of adjusting fares of common tickets, the diagram showing another manner of data transfer.

According to a billing system shown in FIG. 19, information read from the tickets is transmitted from the offices 73, 74, 75 to the fare adjustment center 79 through telephone sets 83, 84, 85 on a read-time basis, or data sheets printed by printers 86, 87, 88 and brought or mailed to the fare adjustment center 79.

While in the foregoing embodiments the present invention has been described with reference to railway and bus transportation networks, the invention is also applicable to other transportation networks such as of monorails, streetcars, ships or their interconnected networks.

Although certain preferred embodiments have been shown and described, it should be understood that many changes and modifications may be made therein without departing from the scope of the appended claims.

What is claimed is

1. A method of allocating ticket fares to be commonly usable in a plurality of companies operating a plurality of transporation routes, comprising the steps of:
   issuing tickets storing information magnetically indicating at least uniform fares applicable to all the transportation routes and a name of a company issuing the tickets, said tickets being issued by each transporation company and commonly usable in all transportation routes;
   collecting in advance a lump sum of ticket fares for a trip comprising a plurality of routes to be traveled at the company issuing said tickets;
   selecting by users any of said routes with use of said commonly usable tickets;
   retrieving said tickets at a last transportation route operated by one of said plurality of companies actually taken by each of the users;
   reading at least information indicative of the name of the company issuing said tickets and said uniform fares from each of said retrieved tickets;
   totaling at said last transportation route the number of tickets used in each of said routes actually taken by each of the users; and
   settling said lump sum of ticket fares between the company issuing said tickets and each of the plurality of companies operating said transportation routes actually taken by each of said users.

2. A method of allocating ticket fares among a company operating a first route and a plurality of companies operating a plurality of second rotues, an entraining point of each of said second routes being connected with a specific stop of said first route of said first operating company, said second routes being selectively usable by each of users, comprising the steps of:
   issuing tickets at the company operating said first route, said tickets storing information magnetically indicative of at least the name of the company issuing said tickets and a lump sum ticket fares indicating fares applicable to said first route and any of said plurality of second routes;
   collecting in advance at the company operating said first route said lump sum ticket fares for said first route and any of said second routes to be actually taken by each of the users;
   selectively transferring by each of the users from said first route to any of said second routes with use of said tickets;
   retrieving said tickets at operating each of said plurality of companies a corresponding second route actually taken by each of said users;
   reading at each of said plurality of companies operating said corresponding second route actually taken by a user information at least indicative of the name of the company operating said first route and said lump sum ticket fares, from each of said retrieved tickets;
   totaling at each of said plurality of companies operating said second routes the number of tickets used on said first route and the corresponding second route actually taken by each of said users; and
   demanding fares for the corresponding second route actually taken of each of said users from each of said plurality of companies operating said corresponding second route actually taken by each of the users to the company operating said first route.

3. A method of allocating ticket fares among a plurality of companies operating a plurality of first routes and a company operating a second route, stops of each of said first routes being nearby each other and an entraining point of said second route being nearby said stops of said first routes, comprising the steps of:
   issuing tickets at each one of the companies operating said first routes, said tickets storing information magnetically indicating at least the name of the company operating a corresponding one of said first routes, and a lump sum of ticket fares to be paid by each user for a trip consisting of one of said first routes and said second route;

collecting in advance at a company operating a first route said lump sum of ticket fares for said trip consisting of one of said first routes and said second route;

selectively transferring by users from any one of said first routes to said second route with the use of said tickets;

retrieving said tickets at said company operating said second route after trips are finished;

reading at said company operating said second route information at least indicative of the name for the company operating a corresponding one of said plurality of first routes and said lump sum of ticket fares from each of said retrieved tickets;

totaling at said company operating said second route the number of tickets for each of said plurality of first routes taken by users and classifying said tickets into each of the plurality of companies operating said plurality of first routes; and demanding fares for said second route taken by users by the company operating said second route from each of the plurality of companies operating said plurality of first routes.

* * * * *